Aug. 7, 1962  W. T. RENTSCHLER  3,048,090
PHOTOGRAPHIC CAMERA
Filed Feb. 18, 1959

INVENTOR.
Waldemar T. Rentschler
BY
Munn, Liddy, Daniels & March
ATTORNEYS

United States Patent Office 3,048,090
Patented Aug. 7, 1962

3,048,090
PHOTOGRAPHIC CAMERA
Waldemar T. Rentschler, Calmbach (Enz), Germany, assignor to Alfred Gauthier, G.m.b.H., Calmbach (Enz), Germany
Filed Feb. 18, 1959, Ser. No. 794,193
Claims priority, application Germany Feb. 20, 1958
6 Claims. (Cl. 95—10)

This invention relates to photographic cameras wherein automatic or semi-automatic setting means are provided, and more particularly to cameras of this type wherein an electric motive means is energized through an amplifier device and arranged to actuate a setting member of the camera.

The present invention embraces inventive subject matter which is related to the invention set forth in a copending application Serial No. 788,594, filed January 23, 1959, and entitled Photographic Camera With Automatic Exposure Setting Mechanism.

In this copending application there is disclosed a photographic camera having an automatic exposure setting mechanism which utilizes an energized control device comprising two electronic amplifiers, preferably of the transistor type, to effect energization of an electric motor which is arranged to drive an exposure regulator member of the camera to effect a proper adjustment thereof for the existing picture-taking conditions. The control device in the form of the electronic amplifiers is under the control of contact means which is actuated by a moving coil relay in turn energized by the current from a photoelectric element. The electric motive means, in the form of a continuous current motor, is connected with the output circuits of the amplifiers whereby energization of one or the other of the amplifiers will effect either forward or reverse rotation of the motor. The contact means which is controlled by the moving coil relay includes a movable contact actuated by the relay, said movable contact being engageable with two cooperable fixed contacts which are connected to the input circuits of the amplifiers.

By the provisions of the said electronic amplifiers, arranged between the contact means of the moving coil relay and the continuous current motor, the said contact means is subjected to an inappreciable current of such small value that there is no melting, sticking, pitting or burning of the contacts even when the latter are actuated at a high switching frequency. In consequence, the physical conditions such as spacing, and size and shape of the contacts are not altered to impair the operating efficiency thereof, and of the automatic setting device. A photographic camera constructed in accordance with the disclosure of the copending application above referred to is thus characterized by great reliability of operation, as regards the automatic adjustment of the exposure setting means, and is further characterized by a very high accuracy of adjustment of said means.

An object of the present invention is to provide an improved photographic camera having the features and advantages of the structure disclosed in the referred to copending application, and having in conjunction with such features the further advantage that the current source or source of energy for the electronic amplifiers and the continuous current motor is protected against excessive or useless drain whereby a very long life expectancy is had therefrom.

In accordance with the present invention this object is accomplished by the provision of circuit breakers which are connected in the energizing circuits for the electronic amplifiers, such energizing circuits including the sources of current not only for the amplifiers but also for the continuous current motor. The said circuit breakers are arranged to be automatically operated in a novel manner in response to actuation of an operational part of the camera, which part of necessity must be actuated during the process of preparing the camera for the making of an exposure.

In accordance with the invention there is further had the important advantage that the switching-on of the batteries or current sources, which is necessary for the operation of the amplifiers and continuous current motor, is effected only a very short time before the exposure is made; that is, the switching-on of the current sources is effected only when the current is required. By such organization a maximum degree of economy is effected in the utilization of the current from the batteries or other sources, and in consequence there results the maximum useful life of the batteries and a minimum of upkeep expense.

The particular manner of operation of the circuit breakers as provided by the invention, through the operation of an operational part of the camera which must be actuated as a step in the process of readying the camera for an exposure, is very significant and represents an important feature and advantage since no additional operation and no special attention is required on the part of the operator for the purpose of switching the current source on or off. Therefore, the above-mentioned advantage is always obtained without requiring any special thought of the operator. Such an operational part of the camera, which must be actuated as a step in the process of readying the camera for an exposure, might for example be constituted as the shutter cocking lever, or the shiftable runner-floor of folding cameras, or the extractable lens carrier of tubular cameras.

An especially advantageous execution of the invention is obtained when the circuit breakers are actuated in response to the movement of a well-known covering or cover member, as for example the cover flap, which is arranged in front of the photo-element by which latter the moving coil relay is energized. Such cover flap may be made to readily cooperate with a transmission mechanism which is connected to operate the said circuit breakers, the manner of operation being such that when the cover flap is closed the batteries or curent sources are open-circuited by the circuit breakers, and when the cover flap is shifted to its open position the circuit breakers are made to close and connect the current sources with the amplifier means.

In conjunction with the camera structure disclosed in my copending application referred to, the above arrangement by which the circuit breakers are actuated by the cover flap of the photo-element provides the advantage that on the one hand the moment of closing of the energizing circuit containing the current sources comes simultaneously with the exposing of the photo-element and the energization of the moving coil relay, while on the other hand when the cover flap is again closed the current sources which energize the amplifiers and the motor are disconnected at the same time that the photo-element, which is the source of current for the moving coil relay, is covered and rendered inoperative.

Furthermore, by the above organization there is virtually insured at all times a minimum amount of drain from the batteries which are connected in the energizing circuit, since it is a prevailing practice to carry cameras in an ever ready case and such case is usually designed to fit fairly closely the external shape and configuration of the camera when there are no protruding parts which may be retracted, as for example the cover flap of the photo-element. Accordingly, the mere act of replacing the camera in the case, which requires closing of the said cover flap, insures the disconnecting of the batteries from the amplifiers, thereby saving the batteries from unnecessary drain.

The provision of a transmission mechanism, serving for connecting the cover flap of the photo-element to the circuit breakers, is of advantage in that it enables the said circuit breakers to be installed at any convenient location within the camera housing, thereby resulting in a more flexible organization of the entire automatic setting mechanism.

An advantageous arrangement for actuation of the circuit breakers, not only from the standpoint of manufacture but also from the standpoint of reliable operation, is had when the transmission mechanism actuated by the cover flap includes a movable part, as for example a longitudinally shiftable pin or a turnable lever, having a portion which projects into the path of movement of the cover flap as the latter is shifted from open to closed positions. The use of such a pin or lever as part of the transmission means provides an especially simple construction which is also saving of space.

Furthermore, the invention may be advantageously carried out when the transmission mechanism and the circuit breakers which are actuated thereby are constituted as a single or unitary assemblage, mounted on a common carrier or base. By such organization there is obtained an advantage in the technique of manufacture, in that the assembly of the transmission mechanism and circuit breakers can be done outside of the camera in a way to facilitate this operation, and such assemblage can thereafter be installed in the camera as a completely assembled construction unit. The use of a carrier or base which is constituted of insulating material makes it unnecessary to provide special insulation of the individual components of the assemblage, which simplifies further the construction of the unit.

Unintentional or inadvertent closing of the circuit breakers can be prevented in a simple and advantageous manner, by insuring the holding of the circuit breakers in open positions through the use of a well-known locking device arranged to cooperate with the cover flap for the photo-element, to securely fasten the said flap in its closed position.

In the accompanying drawings and in the following description an embodiment of the invention is illustrated and described, and the above mentioned advantages and others resulting from the invention are explained in detail.

FIGURE 1 is a diagrammatic representation of the essential connections of an automatic exposure setting device of the type described in detail in the referred-to copending application, there being also shown schematically the circuit breakers as provided by the invention, installed within the camera housing and connected for controlling the energizing circuits of the amplifiers. In FIGURE 1 the circuit breakers are shown as being in closed positions.

As will be observed from an inspection of FIGS. 1–4, the automatic exposure setting mechanism embodies a control device in accordance with the disclosure of the copending application above referred to, said control device including a pair of electronic amplifiers constituted preferably as transistor amplifiers. The details of construction and operation of the said control device, not being the subject of the present invention, are not explained herein in detail but only insofar as is necessary to a complete understanding of the present invention.

Figure 1:
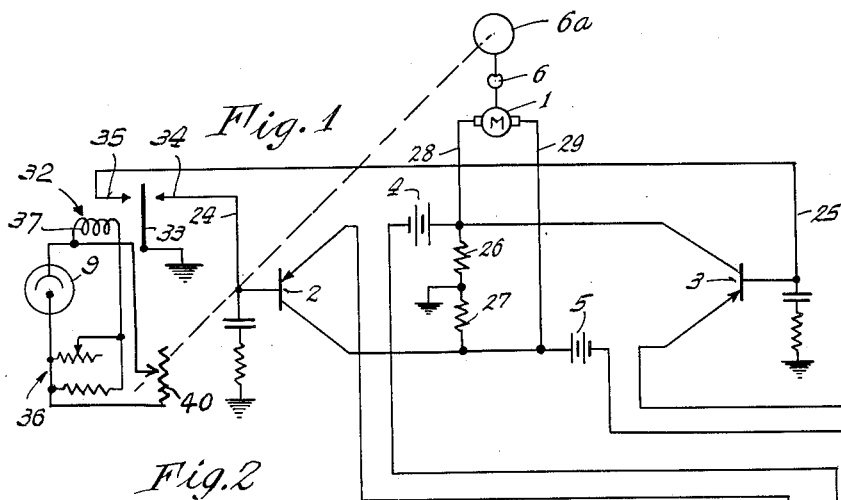

Referring to FIGURE 1 there is shown an electric motor 1 which is of the continuous current type, said motor being connected in the output circuits of two electronic amplifiers having transistors 2 and 3. The motor 1 is shown as connected to a reduction gear mechanism 6 which in turn is connected to drive an exposure setting control, such as a diaphragm setting ring 6a. It will be understood that the two amplifiers may be of any type, employing vacuum tubes, transistors or other electronic devices; for purposes set forth in the copending application referred to the amplifiers are preferably constituted with switching-type transistors 2 and 3 as shown. Energization of one of the amplifiers results in a forward turning of the motor 1, and energization of the other amplifier (with the first now de-energized) results in a reverse rotation of the motor 1. The energization of the amplifiers is effected by a contact means under the control of a movable coil relay hereinafter described in detail, said contact means having a movable contact actuated by the relay coil and two cooperable stationary contacts which may be connected respectively to the wires 24 and 25 joined to the bases of the transistors 2 and 3.

As shown in FIGURE 1, the output circuits of the two amplifiers, comprising the wires 28 and 29, are connected with one another in a bridge connection. Also, it can be seen in FIG. 1 that the motor 1 is connected in a branch of the bridge, said bridge including resistors 26 and 27 having a common connection which may be grounded as shown. It will be understood that the current in the motor branch of the circuit may be reversed by alternating the energization of the amplifiers having the transistors 2, 3. The electronic amplifiers have batteries 4 and 5 which are arranged in the emitter commutating circuit of the transistors 2, 3. The continuous current motor 1 is preferably of the miniature high speed type which, as mentioned above, is connected with reduction gearing in turn coupled with the diaphragm setting ring 6a of the camera.

In accordance with the present invention I provide a novel means for sparing the batteries 4 and 5 when the control device is not being used. The said novel means comprises circuit breakers or switches 7 and 8, which are connected for automatic actuation in resonse to movement of an operational part of the camera, which part of necessity must be actuated as a step in the process of readying the camera for the taking of a picture.

In the illustrated embodiment of the invention the actuation of the switches or circuit breakers 7 and 8 is effected in response to movement of a cover flap 10 which is movably mounted in front of the photo-element 9. For cooperation with the cover flap 10 there is provided a longitudinally shiftable pin 13, which is shiftable in the upper portion of the camera housing and which projects into the recess or light well 12 provided at the front of the photo-element 9. The foremost end of the pin 13 is thus disposed in the path of movement of the cover flap 10. Connected with that end of the pin 13 which lies at the inside of the camera housing 11 is a one-armed lever 15 pivotally carried by a pin 14 and biased in a counterclockwise direction by a spring 16.

Also, on the lever 15 there is provided an actuation member 17 of insulating material, having a bifurcated end constituted by fingers 17a and 17b. The fingers 17a and 17b are arranged to actuate respectively the circuit breakers or switches 7 and 8.

In accordance with the present invention the mechanism consisting of the parts or components 13, 14, 15, 16 and 17 making up the transmission device actuated by the cover flap 10, as well as the circuit breakers 7 and 8 are assembled to constitute a single construction unit, said unit including a common carrier 18 which is preferably constituted of a sheet of insulating material. This arrangement provides the advantage that the said unitary assemblage comprising the transmission and the circuit breakers can be completely fabricated externally of the camera housing, in an efficient manner arranged to facilitate the work. The said unitary assemblage can be thereafter mounted within the camera housing, as by the use of screws 19.

Figure 3:
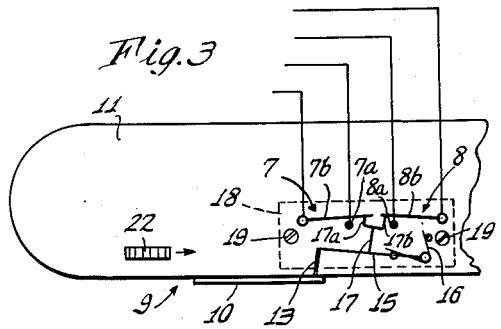
FIGURE 3 is a diagrammatic representation of the circuit breakers and camera housing, similar to the showing of FIG. 1 but illustrating the circuit breakers in their open positions.

For the purpose of holding the switches or circuit breakers 7 and 8 in their open-circuit positions as shown in FIG. 3, a well-known locking device is provided on the upper part 11 of the camera housing. The said device cooperates with the cover flap 10, and is arranged to secure the cover flap in its closed position as shown in FIG. 4.

Figure 2:
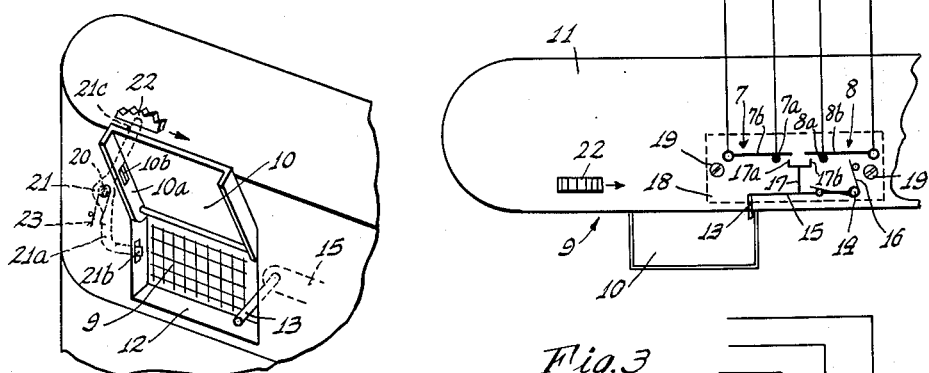
FIGURE 2 is a fragmentary perspective view of a portion of the camera housing wherein the photo-element is carried at the front wall, there being also shown a cover flap for the said photo-element. The cover flap is illustrated in its open position, corresponding to the closed positions of the circuit breakers shown in FIG. 1.
Figure 4:
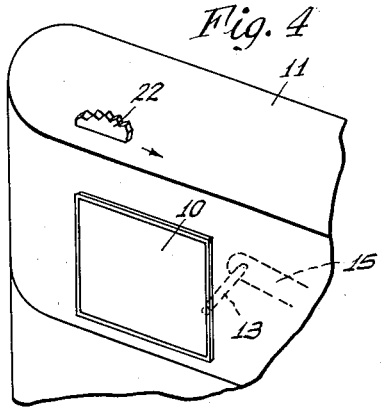
FIGURE 4 is a fragmentary perspective view of a camera similar to the view of FIG. 2 but showing the cover flap for the photo-element in its closed position. This position of the cover flap corresponds to the open positions of the circuit breakers shown in FIG. 3.

In the illustrated embodiment of the invention, referring to FIGS. 2 and 4, the locking device for the cover flap 10 is constituted by a two-armed lever 21 which is pivotally carried by a spindle 20, fixed in the upper part 11 of the camera. The lever 21 has an angularly bent arm 21a, having a tip or end 21b which projects out of a side opening of the recess or light well 12 provided in front of the photo-element 9. The other arm 21c of the lever 21 is connected with a manually engageable portion 22 which is movable along the upper wall 11 of the camera housing. Also, a spring 23 is provided, which biases the lever 21 counterclockwise as viewed in FIG. 2, thereby to maintain the end or tip 21b of the lever in a position projecting into the recess 12, as shown.

To enable the end 21b of the lever 21 to cooperate with the cover flap 10, an aperture 10b is provided in a side flange 10a of the cover flap, as shown in FIG. 2. Under the action of the spring 23 the end 21b of the lever will be made to extend into the aperture 10b when the cover flap 10 is closed, thereby to securely lock the flap in its closed position.

Release of the above-described locking device is effected by merely shifting the portion 22 of the lever 21 in the direction of the arrow, as seen in FIGS. 2 and 4. By such movement the lever 21 is shifted clockwise against the action of the spring 23, and the end or tip 21b of the lever is retracted from the aperture 10b of the cover flap. A spring not shown herein, which acts on the cover flap 10, now effects an automatic opening of the cover flap in a well-known manner, the said spring further retaining the cover flap in its open position.

The operation of the control device of the present invention, as above set forth, is as follows:

After release of the locking device by means of shifting the finger piece 22 in the above-described manner, the cover flap 10 will automatically spring from its closed position of FIG. 4 to the open position shown in FIG. 2, under spring action. Simultaneously with the opening movement of the cover flap 10 the pin 13 which cooperates with the flap is released, enabling the lever 15 under the action of the spring 16 to shift in a counterclockwise direction until the movable switch parts 7b and 8b of the switches 7 and 8 respectively engage the fixed contacts 7a and 8a. Previously the switch parts 7b and 8b were retained in open-circuit position by the actuator member 17, as will be understood. Upon this engagement of the contacts occurring, the energizing circuits for the electronic amplifiers will be closed. The batteries 4 and 5 will now be connected to supply current for the operation of the transistors 2, 3 as well as for the continuous current motor 1.

If now one of the electronic amplifiers comprising the transistors 2, 3 will be energized while the other is de-energized, the motor 1 will be made to rotate in one direction. Or, if the other of the electronic amplifiers is energized with the first one de-energized, the motor 1 will be operated in a reverse direction. As explained in detail in the copending application above referred to, selective energization of one or the other of the electronic amplifiers is effected by a control responsive to the light conditions which influence the photo-element 9. The intensity of the light from the photo-element 9 determines the value of the current flowing through a movable coil relay 32, which relay actuates a movable contact 33 engageable with one or another of two stationary contacts 34 and 35 connected with the wires 24, 25. If such movable contact does not engage either of the stationary contacts connected with the wires 24, 25, neither of the electronic amplifiers will be energized. When the movable contact engages one or the other of the stationary contacts, then one or the other of the electric amplifiers will be energized, driving the motor 1 in either one direction or the other. The motor 1 when operating shifts the setting ring 6a through the medium of the reduction gearing 6, as will be readily understood.

The photo-element 9 may be connected through a suitable adjustable control 36 with a coil 37 of the relay 32. It will be understood that the relay 32 in conjunction with the electronic amplifiers constitutes an electro-responsive control device arranged to be operated in response to the energy from the photo-element 9, said control device being connected with the energizing circuit 28, 29 of the motive means and effecting a control of the latter as powered by the voltage source comprising the batteries 4, 5.

Bridging the photo-element 9 is an adjustable resistor 40 which is mechanically coupled to and actuated by the diaphragm setting ring 6a, such arrangement being similar to that disclosed in the copending application identified in the preamble to this specification. As explained in this copending application, adjustment of the diaphragm setting ring effects a simultaneous adjustment of the bridging resistor across the photo-element whereby a balance is had, by which different adjusted positions of the diaphragm setting ring are obtained, as is well understood in the art.

After the camera has been automatically set for the exposure, and after the operator has completed the exposure of the film, the cover flap 10 is again closed. Such action now shifts the pin 13 inward or toward the interior of the camera housing, in consequence of such pin being disposed in the path of movement of the cover flap. This shifting of the pin 13 will cause the lever 15 to swing in a clockwise direction against the action of the spring 16. In consequence, the actuator member 17 which is mounted on the lever arm 15 is moved to cause the fingers 17a and 17b thereof to shift the switch arms 7b and 8b so as to open circuit the switches 7 and 8. This action is clearly illustrated in FIG. 3. The open-circuit positions of the switches 7 and 8 are maintained by virtue of the locking device which holds the cover flap 10 in its closed position, as will be understood. In the embodiment of the invention illustrated herein there is shown a control device (comprising the electronic amplifiers for effecting an automatic setting of the camera) which is of the type illustrated and described in the copending application above referred to. However, the invention is not limited to such specific type of automatic setting device, since it has utility in connection with photographic cameras having automatic setting devices of any type, wherein there is employed a voltage or current source which is separate from the photo-element. The concept of the invention, embracing a means for closing one or more circuit breakers in response to actuation of an operational part of a camera (which part of necessity must be actuated during the operations required to make the camera ready for an exposure) is independent of the specific type of control device, having the special advantage that the voltage or current source is switched on only a short time before the automatic setting means of the camera comes into action.

In connection with the similar automatic switching-off of the voltage or current sources after effecting the automatic setting of the camera there is thus obtained an organization wherein the most economical use of the battery current is made, resulting in an extended period of usefulness of the batteries or other current sources. This is of special importance in effecting an economical operation of an automatic setting device of the type disclosed herein. The illustrated organization wherein the circuit breakers are actuated in response to movement of the cover member for the photo-element, as described herein, has the further important advantage in that the control of the energizing circuits for the electronic amplifiers is effected in a particularly simple and reliable manner. The act of closing the cover member for the photo-element after the exposure has been effected is an act that the operator normally carries out, and accordingly no explanation is required since the existence of the cover flap has only one purpose, namely to cover the light well provided for the photo-element, after use of the latter in effecting an automatic setting of the camera.

I claim:

1. In a photographic camera, in combination, an exposure-setting device; an electric motor for actuating said device; an electronic amplifier means for energizing the motor, said means having an input circuit and an energizing output circuit, and having an exhaustible current source connected to the energizing output circuit; contact means in the said input circuit; a moving coil relay controlling said contact means; a photo-element for energizing said relay; a circuit breaker device in said energizing output circuit, for switching the same open and closed; and an operational part movably mounted on the camera and arranged to require actuation prior to effecting setting of the camera, connected with said breaker device to effect closing of the energizing circuit in response to the said actuation, said breaker device otherwise maintaining the output circuit open to prevent wasting of the said current source, said operable part comprising a movable cover for said photo-element; and a transmission mechanism effecting the connection between the breaker device and said operational part, said energizing circuit being switched closed when the cover is open and vice versa.

2. The invention as defined in claim 1 in which the movable cover has a predetermined path of movement between open and closed positions, and in which the transmission mechanism includes a movable part disposed in the path of movement of the cover.

3. The invention as defined in claim 1, in which the transmission mechanism and breaker device are constituted as a unitary assemblage, said assemblage including a carrier on which the said mechanism and device are mounted.

4. The invention as defined in claim 1, in which there is a manually operable releasable lock cooperable with the cover, for releasably holding the latter in closed position.

5. In a photographic camera, in combination, a photo-element; an electro-responsive control device arranged to be operated in response to the energy from said photo-element; an exposure setting device; an electric motive means for actuating said setting device; a voltage source adapted to energize said motive means, said voltage source being separate from said photo-element; an energizing load circuit for connecting said motive means and voltage source, said control device being connected with said energizing load circuit and effecting a control of the motive means as powered by said voltage source; a circuit breaker in said energizing load circuit for connecting and disconnecting the voltage source; and an operational part movably mounted on the camera and arranged to require actuation prior to effecting setting of the camera, connected with said circuit breaker to effect connection of the voltage source in response to the actuation of said part, said breaker device otherwise maintaining the load circuit open to prevent wasting of the said voltage source, said operational part comprising a cover device for said photo-element, said cover device when concealing the element causing the circuit breaker to disconnect the voltage source and vice versa.

6. In a photographic camera, in combination, an exposure-setting device; a reversibly operative electric motor for actuating said device; an electronic amplifier means comprising two alternately operable and switchable amplifiers for energizing and powering the motor respectively for operation in either of its directions, said means having two input circuits and an electrical energizing output driving-power circuit, and having an exhaustible drive-power current source connected in the energizing output circuit; contact means in each of the said input circuits, to render operative either one or the other of the two amplifiers; a non-battery powered, sensitive moving coil relay controlling said contact means to cause alternate operation of the same and the amplifiers; a photo-element continually connected to the coil of the relay for energizing the same, said photo-element and its connections being electrically independent of said input and output circuits and said relay coil being electrically independent of said amplifiers; a power-interrupting electrical circuit breaker device in said energizing output driving-power circuit, for switching the same open and closed to conduct electrical power to the motor or shut off said power from the motor, said circuit breaker device being independent of said photo-element; and an operational part movably mounted on the camera and arranged to require actuation prior to effecting setting of the camera, connected with said breaker device to effect closing of the energizing circuit in response to the said actuation, said breaker device otherwise maintaining the output circuit open to prevent wasting of the said current source and being independent of the photo-element and coil of the relay whereby said element and coil are always operatively connected.

References Cited in the file of this patent

UNITED STATES PATENTS

| 2,150,365 | Dziewior | Mar. 14, 1939 |
| 2,305,294 | Kuppenbender | Dec. 15, 1942 |
| 2,683,402 | Bruck | July 13, 1954 |
| 2,913,969 | Faulhaber | Nov. 24, 1959 |

FOREIGN PATENTS

| 491,410 | Great Britain | Sept. 1, 1938 |
| 787,720 | Great Britain | Dec. 11, 1957 |